July 5, 1927.
A. D. BRIXEY
FRAMING DEVICE
Filed Oct. 11, 1919
1,634,769
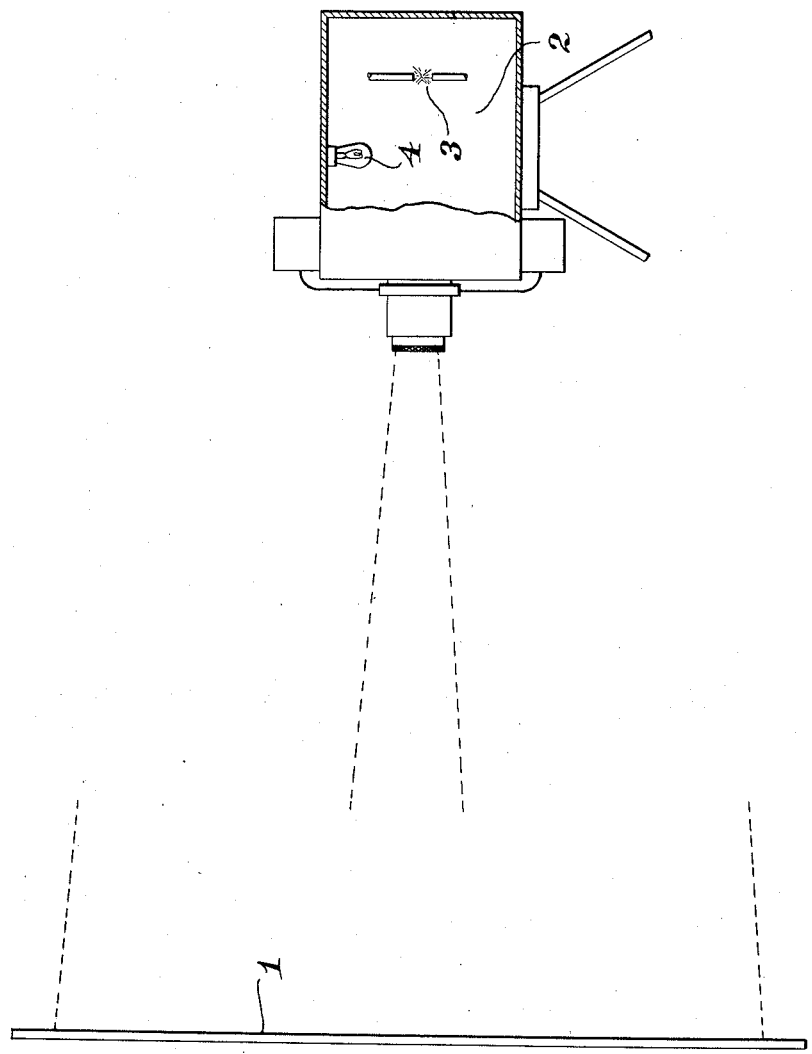

Patented July 5, 1927.

1,634,769

UNITED STATES PATENT OFFICE.

AUSTIN DAY BRIXEY, OF NEW YORK, N. Y., ASSIGNOR TO THE REPLITURA CORPORATION, A CORPORATION OF NEW YORK.

FRAMING DEVICE.

Application filed October 11, 1919. Serial No. 330,097.

This invention relates to means for adjusting a moving picture film with relation to the window of a projector so that the picture may be properly "framed" upon the screen.

The proper adjustment may be effected by observing the relation of the picture on the film to the window. The projector light is too intense for this purpose and when it is extinguished the ensuing darkness prevents the making of the desired observation.

It is the object of the present invention to provide a light whereby the framing observations as indicated can be accomplished. This may be accomplished by dimming the projecting light or by providing an auxiliary light of less intensity for illuminating the window during the framing observations.

Other and ancilliary objects of the invention will appear hereinafter.

In the accompanying drawing, which illustrates the invention, is shown a side elevation of a screen and moving picture projector, the latter being shown partly in section.

Referring to the drawings, the apparatus comprises a screen 1 on which the pictures are exhibited and upon which the light rays (indicated by dotted lines broken away at the centre to bring the drawing within the compass of the sheet) are projected by means of suitable projecting apparatus having a lamp house 2 within which are an electric arc light 3 of high intensity for projecting the pictures upon the screen, and also within the lamp house is an electric incandescent lamp 4 of much less intensity than light 3 and suitable for illuminating the window so that adjustment of the film pictures may be effected. The lamp 4 may derive its current from any suitable source in a well known manner as may also the light 3 as is well understood, and the lenses, film handling devices, shutter and other parts of the apparatus may be of any of the suitable constructions well known in the art.

When a film is to be adjusted in the apparatus, the lamp 4 is lighted and the arc 3 extinguished. A light of suitable intensity is thus provided whereby the desired observation can be made in adjusting the film so as to bring the picture into proper relation with the projector window. This adjustment having been effected, the light 3 may be lighted and the lamp 4 preferably extinguished, the film started in operation and the exhibition be proceeded with.

While the invention has been illustrated in what is considered its best application, it may have other embodiments without departing from its spirit and is not therefore limited to the structures shown in the drawings.

What I claim is:

1. In a moving picture apparatus, the combination with a screen, of a projecting apparatus for projecting moving pictures thereon comprising a projecting light of sufficient intensity to illuminate said screen to project pictures thereon and an auxiliary light upon the interior of the lamp house of said projecting apparatus, of less intensity than said projecting light for illuminating the projector window.

2. A projecting apparatus for projecting moving pictures comprising a projecting light and an auxiliary light upon the interior of the lamp house of said projecting apparatus, of less intensity than said projecting light for illuminating the projector window.

3. A moving picture projecting apparatus including a projecting light and an auxiliary framing light within said apparatus and of less intensity than said projecting light for illuminating the projector window so as to render the pictures on the film easily discernible for facilitating the framing operation.

In testimony whereof I have signed this specification this 5th day of August, 1919.

AUSTIN DAY BRIXEY.